April 6, 1948. R. R. CURTIS 2,439,242
PUMP VALVE CONSTRUCTION
Filed March 26, 1943
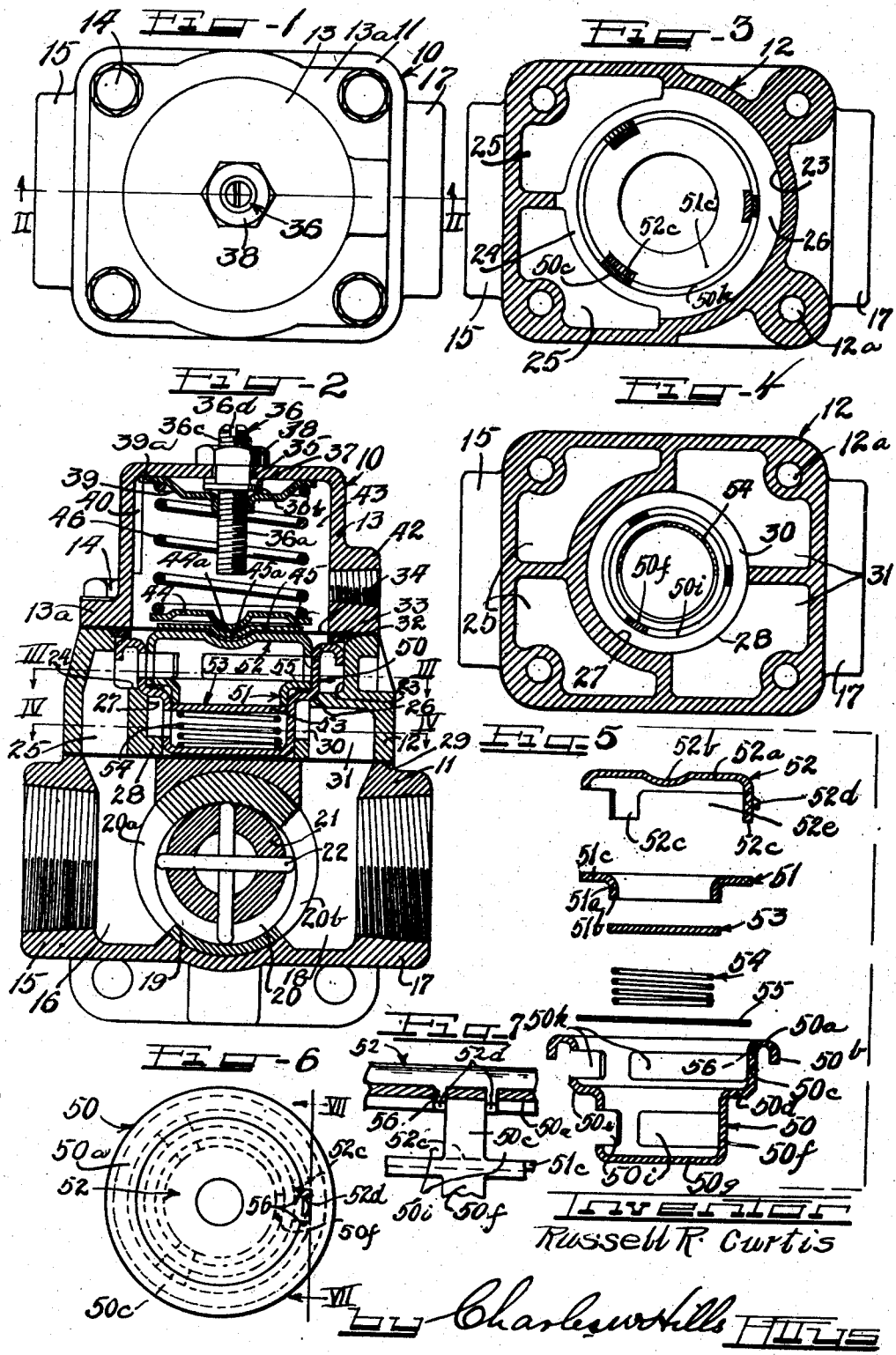
Inventor
Russell R. Curtis
by Charlesworth Hills
Attys Patented Apr. 6, 1948

2,439,242

UNITED STATES PATENT OFFICE 2,439,242

PUMP VALVE CONSTRUCTION

Russell R. Curtis, Dayton, Ohio, assignor to Curtis Pump Company, Dayton, Ohio, a corporation of Ohio Application March 26, 1943, Serial No. 480,646

9 Claims. (Cl. 137—53)

1

This invention relates to a valve construction for pumps and the like fluid transfer mechanisms.

Specifically, the invention relates to inexpensive by-pass and relief valve constructions that can be manufactured with relative ease as by die pressing and stamping sheet metal, by die casting metal or by molding plastic material. In die casting and molding the valve constructions of this invention readily removable cores are usable.

While the invention will be hereinafter specifically described as embodied in an aircraft fuel pump, it should be understood that the constructions of this invention are not limited to such usage.

In aircraft fuel systems it is preferred to employ fuel pumps in series or tandem arrangements so that, in the event one of the pumps becomes inoperative, the other pump will still supply sufficient fuel to the airplane engine for maintaining flight. In such installations the pumps must have bypass means therein permitting passage of fuel through the inoperative pump.

Further, it is also desired to maintain a constant fuel pressure at the carburetor of the airplane engine based on ambient air pressure or supercharger pressure such as exists in the intake manifold of the engine. Since the pump may deliver fluctuating pressures it is desirable to provide, in the pumps, a relief valve mechanism which will vent excess pressures back to the intake side of the pump. These relief valves can be set to maintain any desired pump pressure by means of an adjustable spring. A diaphragm arrangement is also provided to be subjected to pump discharge pressure on one side thereof and ambient air or supercharger pressure on the other side thereof. This diaphragm automatically compensates for fluctuations in the air and fuel pressures so that the discharge pressure of the pump is controlled entirely by the adjustable spring means.

According to this invention, inexpensive combined relief valve and by-pass valve assemblies are made from nested members including an external cup, a by-pass valve seat ring in the cup, an inverted internal cup closing the open top of the external cup, and a by-pass valve disk in the external cup cooperating with said seat ring. The cups, seat ring and valve disk can be made from sheet metal by stamping and pressing operations. Any one or all of the parts can also be die cast or molded.

The external cup member has an intermediate inwardly offset portion providing an external relief valve face and an internal shoulder receiving the seat ring thereon. The inverted internal cup member is seated in the external cup member to close the open top of the external cup and to hold the seat ring on the shoulder. The valve disk is positioned in the external cup between the closed bottom of the cup and the seat ring. The cup members have ports on opposite sides of the by-pass valve disk so that fuel can be by-passed and relieved through the cup members.

It is, then, an object of this invention to provide simple, inexpensive by-pass and relief valve constructions adapted to be stamped from sheet metal, die cast or molded.

A further object of the invention is to provide a relief valve member with external guide portions at the ends thereof and a valve face intermediate said guide portions.

A further object of the invention is to provide an assembly of nested members adapted to serve as a relief valve and a seat for a by-pass valve, while accommodating flow of fluid therethrough.

A further object of the invention is to provide a cup-shaped member having a depression in the closed end thereof serving as a centering device for a spring-urged member.

A further object of the invention is to provide cup members in inverted, nested relation with a seat ring therebetween to form an external relief valve and an internal by-pass valve seat together with external relief valve guide portions and a spring centering portion.

Other and further objects of the invention will be apparent to those skilled in the art from the following detailed description of the annexed sheet of drawings which, by way of preferred example only, illustrates one embodiment of the invention.

On the drawings:

Figure 1 is a top plan view of a pump equipped with a valve construction according to this invention.

Figure 2 is a vertical cross-sectional view taken along the line II—II of Figure 1.

Figure 3 is a horizontal cross-sectional view taken along the line III—III of Figure 2.

Figure 4 is a horizontal cross-sectional view taken along the line IV—IV of Figure 2.

Figure 5 is an exploded vertical cross-sectional view of the relief valve and by-pass valve parts.

Figure 6 is a top plan view of the valve assembly.

Figure 7 is a fragmentary vertical cross-sectional view taken along the line VII—VII of Figure 6.

As shown on the drawings:

In Figures 1 and 2 the reference numeral 10 designates generally a pump and valve assembly including an open-topped pump casing 11, an open-ended valve casing 12, and an open-bottomed spring casing 13, all held together in superimposed relation by means of bolts or studs 14 extended through an outturned flange 13a of the casing 13, completely through apertures 12a (Figures 3 and 4) in the valve casing 12 into tapped well portions of the pump casing 11.

The pump casing 11 has an internally threaded boss 15 at one end thereof communicating with an inlet chamber 16 therein. A second internally threaded boss 17 is provided at the other end of the casing 11 communicating with the pump discharge chamber 18.

A sleeve 19 is pressed into the casing 11 between the inlet and discharge chambers 16 and 18 and defines, with its inner surface, a pumping chamber 20 which is apertured at 20a to communicate with the inlet chamber 16 and at 20b to communicate with the discharge chamber 18.

A rotor 21 is eccentrically mounted for rotation within the sleeve 19 and has sliding vanes 22 cooperating with the inner surface of the sleeve to pump material from the inlet port 20a to the outlet port 20b.

As shown in Figures 2 and 3, the valve casing 12 has a cylindrical chamber 23 extending inwardly from the open top thereof and having a semi-annular port 24 in the side wall thereof joining the interior of the chamber with passageways 25 communicating with the inlet chamber 16 of the pump casing 11. The cylindrical chamber 23 is bottomed by an annular valve seat 26.

As best shown in Figures 2 and 4, the casing 12 has a second smaller cylindrical chamber 27 coaxial with the chamber 23 and extending beneath the seat 26 to terminate in an apertured bottom wall 28 adapted to seat on a gasket 29 which is disposed between the casings 11 and 12. The chamber 27 has a semi-annular port 30 in the side wall thereof joining the interior of the chamber with passageways 31 communicating with the outlet chamber 18 of the pump casing 11.

The casing 12 may therefore be considered as having a large cylindrical bore extending inwardly from the top thereof and terminating in a valve seat together with a smaller coaxial bore extending from said valve seat to an apertured bottom wall on the casing. The large bore communicates with the inlet of the pump while the smaller bore communicates with the outlet of the pump.

The bore 23 is counterbored as at 32 at the top end thereof to receive a washer 33 projecting into the chamber for a purpose to be more fully hereinafter described.

The casing 13 is in the form of an inverted cup with an outturned flange 13a around the open end thereof. A flexible diaphragm 34 composed of synthetic rubber impregnated fabric or similar material is clamped around the periphery between the outturned flange 13a of the casing 13 and the top of the casing 12. The diaphragm 34 overlies the washer 33 and spans the open mouth of the cup 13 as well as the open end of the bore 23.

The casing 13 has an aperture 35 in the center of the top wall thereof receiving, in free rotatable relation, a post member 36 with a threaded shank portion 36a extending into the casing and an outturned collar portion 36b at the top of the threaded portion 36a having a packing washer 37 thereon engaging the inner face of the top wall of the casing 13.

The post 36 extends above the top wall of the casing 13 and has a threaded projecting end 36c receiving a nut 38 thereon to tighten the packing washer 37 between the collar 36b and the top wall of the casing for preventing leakage through the aperture 35. The top end of this threaded projecting portion 36b has a screwdriver slot 36d therein for rotating the member 36.

A valve spring retainer 39 is threaded onto the portion 36a of the post 36 and has a notch 39a in the periphery thereof receiving a vertical key 40 provided on the side wall of the casing 13 so that the retainer will not rotate when the post is rotated. Rotation of the post will thus move the reainer 39 toward and away from the top end of the casing 13.

The casing 13 has an internally threaded hollow boss 42 on the side wall thereof communicating with the interior of the casing for a purpose to be more fully hereinafter described. The casing being bottomed by the diaphragm 34 thus provides a chamber 43 above the casing 12 vented only through boss 42.

A second spring retainer 44 is mounted in the casing 13 and has a central dimple 44a seated in a rounded depression 45a of a washer 45 overlying the diaphragm 34.

A coiled spring 46 is positioned in the casing 13 between the retainers 39 and 44 and can be maintained under a desired compression by regulation of the level of the retainer 39 through manipulation of the post 36. When the correct position of the retainer 39 is selected the nut 38 can be tightened to prevent further rotation of the post and the desired compression of the spring will be maintained.

As shown in Figure 2, the relief valve and bypass valve assembly of this invention includes a cup 50 slidably mounted in the casing 12 under the washer 33, a seat ring 51 in the cup 50 bottomed on a shoulder therein, an inverted cup 52 closing the open top of the cup 50, a by-pass valve disk 53 cooperating with the seat ring 51, a spring 54 acting on the by-pass valve disk, and a packing washer or gasket 55 between the seat ring and shoulder of the cup 50.

As shown in Figure 5, the cup 50 has an outturned annular flange 50a around the open end thereof with a downturned skirt portion 50b adapted to be slidably guided by the side wall of the chamber 23 of the casing 12. A side wall 50c depends from the inner end of the flange 50a and terminates at an inwardly offset shoulder portion 50d having an annular valve face 50e adapted to seat on the seat 26 of the casing. The side wall of the member 50 continues downwardly at a reduced diameter portion 50f from the inner end of the offset 50d to terminate in a closed bottom 50g.

As shown in Figure 2, the reduced diameter side wall portion of the cup 50, adjacent the bottom of the cup, is slidably guided by the aperture-defining wall in the base portion 28 of the casing. Thus the cup 50 is externally guided at both the top and bottom thereof by the side wall of the chamber 23 and the aperture of the base 28, and has an intermediate annular valve face adapted to seat on the valve seat 26 of the casing 12.

A plurality of ports 50h are formed in the side wall 50c of the member 50 above the offset 50d.

A number of other ports 50i are also formed in the side wall portion 50f below the offset 50d. The ports 50h join the chamber 23 with the interior of the member while the ports 50i join the chamber 27 with the interior of the member. Three ports 50h and three ports 50i are preferably provided so that the side walls 50c and 50f are each in the form of three legs as shown in Figures 3 and 4.

The inverted cup 52, as best shown in Figure 5, has a closed top end 52a with a central rounded depression 52b adapted to receive the central portion of the diaphragm 34 depressed therein by the rounded dimple 45a on the washer 45 as shown in Figure 2. The cup 52 has three legs 52c depending from the side thereof providing three ports 52e therebetween. One of the legs 52c has a pair of kerfs or tangs 52d struck out from the sides thereof for a purpose to be more fully hereinafter described.

The seat ring 51 has a neck portion 51a adapted to fit into the reduced diameter portion 50f of the cup 50 and provide therein with its end face 51b, a seat for the valve disk 53. The ring 51 also has an outturned top flange 51c for seating on the gasket 55 which gasket is bottomed in the cup 50 on the shoulder or offset 50d thereof.

The coil spring 54 is compressed between the bottom 50g of the cup 50 and the valve disk 53 to urge the disk against the seat ring end face 51b.

The inverted cup 52 fits into the top of the cup 50 with the legs 52c bottomed on the flange 51c of the seat ring 51. The kerfs or tangs 52d on one of the legs 52c are provided for straddling one of the legs or side wall portions 50c of the cup 50 to hold the ports 52e and 50h in alignment.

As best shown in Figures 6 and 7, the flange 50a of the cup 50 has a slot 56 therethrough on each side of a leg or side wall portion 50c thereof to receive the outturned tangs 52d of a leg 52c. These tangs 52d will straddle the leg 50c to prevent rotation of the inverted cup 52 in the cup 50. In assembled position, of course, the spring urged diaphragm 34 forces the inverted cup 52 into the cup 50 to hold the legs 52c on the seat ring flange 51c and to hold this flange on the gasket 55.

The spring 46 acting through the diaphragm 34 urges the valve assembly against the valve seat 26. However, since the washer 33 is spaced slightly above the outturned flange 50a of the cup 50, and since the cup 50 and the by-pass valve 53 are exposed to discharge pressures of the pump by being always in communication with the discharge side 18 of the pump through the passageways 31, port 30, and ports 50i, the assembly can be raised off the seat 26 to relieve pressured fluid from the discharge side of the pump into the chamber 23 and thence through the port 24 and passageways 25 into the inlet chamber 16 of the pump. As a result, excessive fluid from the discharge side of the pump can be recirculated back to the intake side of the pump whenever the discharge pressure of the pump is above a desired amount.

In the event the pump is inoperative and another pump in series or tandem relation therewith pressurizes fuel into the intake side 16 of the pump this pressurized fuel can flow upwardly through the passageways 25 and port 24 into chamber 23 and thence through ports 50h and 52e into the cup 50 and seat ring 51 to act on the by-pass valve 53 and compress the spring 54 for moving the valve 53 off its seat 51b. The fluid can then be passed through the ports 50i and 30, through the passageways 31 into the chamber 18 of the pump. Thus fluid can be by-passed from the inlet to the discharge side of the pump.

The apertured boss 42 of the casing 13 is either vented to the ambient air surrounding the pump or to the intake manifold of an airplane engine thus placing the chamber 43 of the casing 13 under ambient air pressure or under engine manifold pressure. The top of the diaphragm 34 is thus acted on by either of these base pressures.

In airplane fuel pumps it is important that a constant selected pressure differential be established by the pump based either on surrounding ambient air pressure or engine manifold pressure. In order that pressure of the spring 46 can be the determining factor for maintenance of the selected pressure differential the diaphragm 34 is arranged for co-movement with the relief valve and it must therefore flex whenever the relief valve moves. In addition the diaphragm has an effective area on one side exposed to base pressure in the spring chamber 43 balanced by an equal relief valve area exposed to pump discharge pressure. Furthermore the effective area of the diaphragm exposed to pump inlet pressure in the chamber 23, which area is determined by the rigid washer 32, and tending to move the relief valve assembly in one direction is balanced by an equal area on the valve assembly tending to move the assembly in the opposite direction.

The assembly of this invention is therefore balanced against compensating variations in base and pump discharge pressures as well as variations in inlet pressures and will maintain a selected pump discharge pressure differential above a selected base pressure. The pressure of the spring 46 will determine this differential and the spring pressure can be manually set by the control post 36.

The washer 32 provides a convenient arrangement for controlling the effective area of the diaphragm since any area of the diaphragm covered by the washer is ineffective with respect to balancing of the assembly. The inner diameter of the washer can be sized in accordance with the effective relief valve areas to produce the balanced assembly thereby permitting large tolerance limits in casing part sizes.

From the above descriptions it will be understood that this invention now provides an inexpensive by-pass and relief valve construction wherein the relief valve carries the by-pass valve and spring so that this spring does not flex in response to movements of the relief valve. Cup and ring members cooperate to provide a relief valve and a seat for a by-pass valve. A simple flat disk provides the by-pass valve. Fluttering of the assembly is eliminated by a dashpot arrangement obtained by seating the bottom of the cup 50 in a closed bottomed aperture or well. The assembly is externally guided both at the top and bottom thereof on side walls of chambers provided by a fixed casing part.

It will, of course, be understood that various details of construction may be varied through a wide range without departing from the principles of this invention and it is, therefore, not the purpose to limit the patent granted hereon otherwise than necessitated by the scope of the appended claims.

I claim as my invention:

1. A relief and by-pass valve assembly comprising a housing having chambers with a relief valve seat between adjacent chambers, a first cup having an outturned flange around the open end thereof with a depending skirt guided on the wall of one chamber, said first cup having an inwardly offset portion intermediate the ends thereof providing an internal shoulder and an external relief valve face cooperating with said relief valve seat, said first cup having a closed bottom end guided by the wall of another chamber, a second cup in said first cup having a closed end with a rounded depression bridging the open end of the first cup, a seat ring bottomed on the internal shoulder of the first cup by the second cup, said ring having a rim edge providing a by-pass valve seat in the first cup, a by-pass valve in said first cup cooperating with said by-pass valve seat, a spring compressed between the by-pass valve and the bottom of the first cup urging the by-pass valve against said by-pass valve seat, the side walls of the cups having ports therein joining the chambers on opposite sides of the relief valve seat with opposite sides of the by-pass valve, and a spring-urged member having a rounded protuberance seated in the depression of the second cup to urge the relief valve against the relief valve seat.

2. A relief and by-pass valve assembly comprising relatively inverted nested inner and outer cups, said outer cup having an inwardly offset side wall portion intermediate the ends thereof to provide an external relief valve face, a by-pass valve seat in said outer cup having a flange clamped between the offset portion of the outer cup and the bottom of the inner cup, and a by-pass valve in the space between the by-pass valve seat in the outer cup and the bottom of the outer cup adapted to seat on said by-pass valve seat, said cups having ports in the side walls thereof on one side of the inwardly offset portion and said outer cup having ports in the side walls thereof on the opposite side of the offset portion.

3. A combined by-pass and relief valve assembly comprising a pair of relatively inverted nested cups, the outer cup having guide surfaces at the top and bottom thereof and an intermediate portion providing an external annular relief valve, the inner cup having a closed wall bridging the open end of the outer cup with a dimple in the center thereof, means in said outer cup having a rim edge providing an annular by-pass valve seat, a by-pass valve operatively mounted in said outer cup in the space between the bottom of the outer cup and said rim edge, a coil spring acting on said by-pass valve to urge the same against said rim edge of the inner cup, said outer cup having a port therein joining the exterior of the cup with the space between the bottom thereof and the by-pass valve, said outer and inner cups having aligned ports connecting the exterior of the outer cup with the interior of the inner cup, and means projecting from the side wall of the inner cup into a port of the outer cup for holding the cups against relative rotation.

4. A relief and by-pass valve assembly comprising relatively inverted nested cups, the outer of said cups having an internal abutment between the ends thereof, a valve seat bottomed on said abutment, means acting on the inner of said cups to hold the valve seat bottomed on the abutment, a by-pass valve in said outer cup urged against said valve seat, and said outer cup having an external valve face therearound.

5. A relief and by-pass valve assembly comprising relatively inverted nested inner and outer cups, said outer cup having an inwardly offset portion intermediate the ends thereof providing an internal shoulder and a reduced-diameter portion, a gasket on said shoulder, a valve seat means having a collar portion extending into said reduced-diameter portion and an outturned flange portion held on said gasket by said inner cup, said outer cup having an external annular valve surface intermediate the ends thereof, a by-pass valve cooperating with the rim of the collar portion of said valve seat means, and said cups having ports in the side walls thereof joining the exterior of the outer cup with the interior of the assembly on opposite sides of said shoulder.

6. A relief and by-pass valve assembly comprising an outer cup having a flanged mouth, a side wall and a reduced diameter portion providing an internal shoulder, a seat ring having a neck portion extending into the reduced diameter portion and a flange portion bottomed on said shoulder, a valve disk for said seat ring, said side wall having ports therein separated by leg-like wall portions, said flanged mouth having slots therethrough along the sides of one leg-like wall portion, a member closing the mouth of said cup having spaced legs in the cup bottomed on the flange portion of the seat ring, and outturned tangs on a leg of said member adapted to pass through said slots to straddle a leg-like wall portion of said cup to hold the cup and member against relative rotation.

7. In a valve assembly, an outer cup having a side wall with an internal shoulder and an external valve face, said side wall having ports therethrough separated by leg-like side wall portions, a member closing the open end of the cup having legs bottomed on said internal shoulder, and means projecting from a leg of said member straddling a leg-like side wall portion of the cup to hold the cup and member against relative rotation.

8. In a valve assembly, an inlet chamber, an outlet chamber, a first valve chamber communicating with the inlet chamber, a second valve chamber communicating with the outlet chamber, a valve seat between said first and second valve chambers, a hollow relief valve assembly slidable in said valve chambers communicating with both valve chambers and having an external valve face cooperating with said seat, a by-pass valve in said assembly separating the interior of the relief valve into two compartments each communicating with a valve chamber, a spring casing defining a spring chamber, a diaphragm separating the spring chamber from the valve chambers, a spring in said spring chamber acting through said diaphragm on said relief valve assembly to urge the assembly toward said valve seat, and a washer in said first valve chamber covering a part of the diaphragm to control the size of the effective area of the diaphragm for balancing the effective area with respect to the valve assembly area.

9. In a pump valve assembly, a valve chamber with a valve seat, a relief valve assembly movably operating in said chamber toward and away from said valve seat, a flat diaphragm cover for said valve chamber, and a spring acting through said diaphragm on said valve assembly, a rigid annulus fixedly mounted in said valve chamber covering a portion of said diaphragm to control the size of the effective area of the diaphragm for balancing the effective area with respect to the valve assembly.

RUSSELL R. CURTIS.

REFERENCES CITED

The following references are of record in the file of this patent:

UNITED STATES PATENTS

| Number | Name | Date |
|---|---|---|
| 937,597 | Grussendorf | Oct. 19, 1909 |
| 1,107,383 | Udstad | Aug. 18, 1914 |
| 1,496,935 | Lemon | June 10, 1924 |
| 1,935,544 | DeLancey | Nov. 14, 1933 |
| 1,977,015 | Rodler | Oct. 16, 1934 |
| 2,170,530 | Johnson | Aug. 22, 1939 |
| 2,174,503 | Whipple | Sept. 26, 1939 |
| 2,196,500 | Johnson | Apr. 9, 1940 |
| 2,263,091 | Johnson | Nov. 18, 1941 |
| 2,264,656 | Briscoe | Dec. 2, 1941 |
| 2,266,314 | Eshbaugh | Dec. 16, 1941 |
| 2,268,807 | Curtis | Jan. 6, 1942 |
| 2,294,609 | Schlosser | Sept. 1, 1942 |
| 2,299,079 | Davis | Oct. 20, 1942 |
| 2,318,157 | Heiser | May 4, 1943 |
| 2,319,659 | Garnes | May 18, 1943 |
| 2,345,547 | Roth | Mar. 28, 1944 |
| 2,353,545 | Caserta | July 11, 1944 |